(12) United States Patent
Desoutter et al.

(10) Patent No.: US 9,688,524 B2
(45) Date of Patent: Jun. 27, 2017

(54) INJECTION DEVICE FOR INJECTING A PRODUCT IN A CONTAINER OR A PREFORM

(71) Applicant: DISCMA AG, Hunenberg (CH)

(72) Inventors: Luc Desoutter, Octeville-sur-Mer (FR); Daniel Diesnis, Octeville-sur-Mer (FR)

(73) Assignee: DISCMA AG, Hunenberg (CH)

( * ) Notice: Subject to any disclaimer, the term of this patent is extended or adjusted under 35 U.S.C. 154(b) by 0 days.

(21) Appl. No.: 14/786,408

(22) PCT Filed: Apr. 22, 2014

(86) PCT No.: PCT/EP2014/058083
§ 371 (c)(1),
(2) Date: Oct. 22, 2015

(87) PCT Pub. No.: WO2014/173870
PCT Pub. Date: Oct. 30, 2014

(65) Prior Publication Data
US 2016/0068379 A1   Mar. 10, 2016

(30) Foreign Application Priority Data

Apr. 25, 2013   (EP) ..................................... 13305544

(51) Int. Cl.
*B67C 3/20* (2006.01)
*B29C 49/42* (2006.01)
(Continued)

(52) U.S. Cl.
CPC .......... *B67C 3/206* (2013.01); *B29C 49/4289* (2013.01); *B29C 49/46* (2013.01);
(Continued)

(58) Field of Classification Search
CPC .. B65B 3/12; B65B 3/32; B67C 3/206; G01F 11/00; G01F 11/04; G01F 11/021
(Continued)

(56) References Cited

U.S. PATENT DOCUMENTS 4,411,601 A  * 10/1983  Hersom ............... A23G 3/0257
                                                    222/129.2
4,676,279 A  *  6/1987  von Lersner ............. B65B 3/32
                                                       137/240
(Continued)

FOREIGN PATENT DOCUMENTS

| DE | 526677 C   | 6/1931 |
|----|------------|--------|
| FR | 657017 A   | 5/1929 |
| FR | 2523720 A1 | 9/1983 |

OTHER PUBLICATIONS

International Search Report of PCT/EP2014/058083 dated Jun. 17, 2014.

*Primary Examiner* — Timothy L Maust
(74) *Attorney, Agent, or Firm* — Eric J. Sosenko; Jonathan P. O'Brien; Honigman Miller Schwartz and Cohn LLP (57) ABSTRACT

An injection device having an inlet, an outlet and a chamber extending between the inlet and the outlet. A piston divides the chamber into an upper chamber and a lower chamber. The piston is movable within the chamber and includes a body. The piston includes a shutter movable with respect to the body between a closed position, wherein the body and the shutter isolate the upper chamber from the lower chamber when the piston is moved in an injecting direction, and an open position, wherein the body and the shutter place the upper chamber in fluidic communication with the lower chamber when the piston is moved in a filling direction.

18 Claims, 7 Drawing Sheets

(51) Int. Cl.
  *B29C 49/46* (2006.01)
  *G01F 11/02* (2006.01)
  *B65B 3/32* (2006.01)
  *B65B 3/04* (2006.01)
  *B67C 3/00* (2006.01)
  *B67C 3/26* (2006.01)
  *B65B 3/02* (2006.01)
  *B29C 49/58* (2006.01)

(52) U.S. Cl.
  CPC ................ *B29C 49/58* (2013.01); *B65B 3/04* (2013.01); *B65B 3/32* (2013.01); *B67C 3/004* (2013.01); *B67C 3/26* (2013.01); *G01F 11/021* (2013.01); *B29C 2049/4664* (2013.01); *B29C 2049/5803* (2013.01); *B65B 3/022* (2013.01)

(58) Field of Classification Search
  USPC ............................ 141/2, 27, 89–91; 222/309
  See application file for complete search history.

(56) References Cited

U.S. PATENT DOCUMENTS

| | | | | |
|---|---|---|---|---|
| 5,309,968 A | * | 5/1994 | Yoshida | ................... B60C 27/10 152/213 R |
| 6,006,953 A | * | 12/1999 | Newson | ............... A01M 7/0046 222/334 |
| 2011/0135778 A1 | | 6/2011 | Andison et al. | |

* cited by examiner

FIG.12

INJECTION DEVICE FOR INJECTING A PRODUCT IN A CONTAINER OR A PREFORM

CROSS-REFERENCE TO RELATED APPLICATIONS

This application is the U.S. national phase of PCT Application No. PCT/EP2014/058083 filed on Apr. 22, 2014, and claims priority to EP13305544.2 filed on Apr. 25, 2013, the entire disclosures of which are herein incorporated by reference herein.

TECHNICAL FIELD OF THE INVENTION

The present invention relates to an injection device for injecting a liquid through an outlet of said injecting device.

The invention also relates to a method for injecting a liquid using such an injection device.

The injection device according to the invention can be used for example for filling containers with a liquid or for forming a container from a preform by injecting a forming liquid inside the preform such that it is deformed and acquires the shape of the container.

In the application, "liquid" has a physical meaning. It designates any incompressible and able to flow medium. The liquid can have a low viscosity (like water or alcohol), a medium viscosity (like edible oil or soup), or a high viscosity (like yogurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

In this technical field, cleaning of the injection device is a very important step in using the injection device since it is used to fill containers, for example bottles, with products that are to be ingested by consumers or applied on the skin of a consumer. Therefore, since the injection device is to be used for filling successive containers or preforms, the injection device has to be cleaned regularly in order to avoid risks of contamination or of soiling the containers or preforms.

Such an injection device is for example disclosed in FR-2 523 720, wherein the filling of the chamber and the injection are controlled by flexible membranes, which are easier to clean than conventional valve systems used in injection devices.

However, the structure of the injection device remains complicated and some areas of the device, in particular around the piston and the flexible membranes, are hardly accessible for the cleaning products. Consequently, in order to fully clean the injection device, parts of the device should be removed from the device and cleaned manually.

Such a step is time consuming and requires the machine for filling containers or for forming containers to be stopped, which greatly reduces the throughput of the machine.

WO-95/11428 discloses an injection device arranged to inject a predetermined quantity of liquid through the outlet of the injection device. However, this injection device does not allow control of the pressure of the injected liquid, which is not suitable for injecting a liquid inside a container at a controllable and possibly variable pressure.

One of the aims of the invention is to overcome these drawbacks by proposing an injection device of simple structure, wherein all the parts of the device are easily accessible to cleaning products, without having to dismantle the injection device.

SUMMARY OF THE INVENTION

To this end, the invention relates to an injection device for injecting a liquid at an outlet of said device, said device comprising:

an inlet for receiving the liquid, an outlet for injecting the liquid and a chamber extending between the inlet and the outlet, a piston extending in said chamber and dividing said chamber into an upper chamber, in fluidic communication with the inlet, and a lower chamber, in fluidic communication with the outlet, said piston being movable in said chamber in a filling direction, wherein the volume of the lower chamber increases while the volume of the upper chamber decreases, and in a injecting direction, wherein the volume of the lower chamber decreases while the volume of the upper chamber increases, said piston comprising a body having a sealing periphery being in liquid tight fitting with the wall of the chamber between the upper chamber and the lower chamber, wherein the piston further comprises a shutter which can move with respect to the body between a relative closed position, wherein the body and the shutter isolate the upper chamber from the lower chamber and prevent fluidic communication between said chambers when the piston is moved in the injecting direction, and a relative open position, wherein the body and the shutter place the upper chamber in fluidic communication with the lower chamber when the piston is moved in the filling direction.

In the injection device according to the invention, the piston is made of two parts forming a valve system enabled to fill the lower chamber and to inject the liquid at the outlet, with said liquid passing through the piston during these steps. Consequently, by simply replacing the liquid to be injected with cleaning products, it is possible to clean the injection device properly, without having parts remaining inaccessible to the cleaning products. Therefore, the injection device can be cleaned easily, without having to dismantle the device or stop the machine in which the injection device is used.

According to another feature of the injection device embodying the invention, the body and the shutter isolate the upper chamber from the lower chamber all along the movement of the piston in the injecting direction.

By placing the shutter and the body in the relative closed position all along the movement of the piston in the injecting direction, the pressure at which the liquid is injected through the outlet is controllable and varied by varying the force applied by the piston on the liquid in the lower chamber. Such a controllable pressure is particularly advantageous for an injection device used in a hydroforming process, wherein the liquid both forms and fills the container and wherein the pressure of the liquid has to be varied during the injection of the liquid in the container.

According to another feature of the injection device embodying the invention, a mechanical actuator is attached to the piston, said mechanical actuator being actuable to move the piston in the injecting direction and in the filling direction.

The mechanical actuator is used to control the movement of the piston and the force applied by the piston on the liquid in the lower chamber.

According to a feature of the injection device embodying the invention, the mechanical actuator comprises an actuation rod attached to the shutter, the shutter and the body being rigid, wherein when the actuation rod is moved in the injecting direction, the shutter closes at least one aperture of the body and moves said body in the injecting direction, and, when the actuation rod is moved in the filling direction, the shutter opens said aperture of the body and moves the body in the filling direction.

According to a particular feature of the injection device embodying the invention, the body defines an inner volume and comprises at least one lower aperture, provided in a lower wall of the body and through which the inner volume is in fluidic communication with the lower chamber, and at least one upper aperture, provided in an upper wall of the body and through which the inner volume is in fluidic communication with the upper chamber, the shutter extending in the inner volume of the body and comprising at least one aperture extending through the shutter and in register with the upper aperture of the body and offset relative to the lower aperture of the body, the actuation rod being movable in the filling and injecting directions between a filling position wherein the shutter is applied against the upper wall of the body such that the upper chamber is in fluidic communication with the lower chamber via the upper aperture, the aperture of the shutter and the lower aperture such that the liquid can be transferred from the inlet to the lower chamber, and an injecting position, wherein the shutter is applied against the lower wall of the body and closes the lower aperture such that the lower chamber is isolated from the upper chamber and the liquid in the lower chamber can be injected through the outlet when the actuation rod is moved in the injecting direction.

According to this feature, the shutter and the body constitute a check valve inside the piston. The particular arrangement of that check valve makes it very easy to be cleaned as the shutter extends inside the inner volume of the body.

According to other features of the injection device according to the invention:
  the injection device comprises angular guiding features designed for keeping a relative angular position between the shutter and the body within a desired range;
  the shutter can be placed in a cleaning position wherein said shutter extends in the inner volume of the body without being applied against the upper wall or the lower wall, the upper aperture being in direct fluidic communication with the lower aperture said cleaning position of the shutter;
  the body comprises at least two upper apertures and at least two lower apertures, the shutter comprising at least two apertures, each of them being in register with one of the upper apertures and offset relative to the lower apertures;
  the mechanical actuator comprises an actuation rod attached to the body and the shutter is a floating shutter, wherein, when the actuation rod is moved in the injecting direction, the shutter closes at least one aperture of the body and is moved by said body in the injecting direction, and, when the actuation rod is moved in the filling direction, the shutter opens said aperture of the body and is moved by the body in the filling direction.

According to a particular feature of the injection device embodying the invention, the body is movable along a body actuation journey comprising an active stroke and a cleaning stroke, the chamber having a cleaning portion extending between the upper chamber and the inlet or between the lower chamber and the outlet, such that, when the body is in the active stroke, the sealing periphery fits the wall of the chamber between the upper chamber and the lower chamber, and, when the body is in the cleaning stroke, the body extends inside the cleaning portion of the chamber, where the sealing periphery of said body is separated from the wall of the chamber by a cleaning space.

During the cleaning of the injection device, the body of the piston can be placed in the cleaning portion of the chamber, wherein the cleaning products are able to flow all around the body of the piston and around the shutter, thereby ensuring a proper cleaning of the piston, particularly of the outside surface of the body.

The invention also relates to a method for injecting a liquid using an injection device as described above, the method comprising:
  a filling step, wherein the shutter is placed in the open position with respect to the body and the piston is moved in the filling direction, such that the liquid coming from the inlet in the upper chamber is moved to the lower chamber via the fluidic communication provided by the shutter and the body in relative open position,
  an injecting step, wherein the shutter is placed in the closed position with respect to the body and the piston is moved in the injecting direction, such that the liquid in the lower chamber is injected through the outlet.

With the method and injection device according to the invention, the control of the injection of liquid can be easily controlled simply by controlling the movements of the piston without needing extra valves, which are complicated to control and to clean.

According to another feature of the method embodying the invention, the filling step and the injecting step are performed by actuating a mechanical actuator attached to the piston.

Advantageously, the piston is moved in the filling direction all along the filling step. Advantageously, the piston is moved in the injecting direction all along the injecting step.

According to other features of the method embodying the invention:
  the piston is moved in the filling direction until a desired volume of the lower chamber, corresponding to volume of liquid to be injected, is reached;
  the method comprises a cleaning step wherein the actuation rod and the body are moved in the chamber alternatively in the filling and injecting directions, said movement causing cleaning products to move from the inlet to the outlet and around the shutter of the piston;
  the body is moved to the cleaning portion of the chamber, wherein the cleaning products are able to move around the body of the piston.

According to a particular feature of the method according to the invention, the body is moved in the cleaning portion of the chamber in the filling and injecting directions to create a turbulent flow in the cleaning portion.

By creating a turbulent flow in the cleaning portion of the upper chamber, it is ensured that the cleaning products are able to flow all around the body of the piston and around the shutter, thereby ensuring a proper cleaning of the piston, particularly of the outside surface of the body.

The method can be used to fill a container by placing the outlet in fluidic communication with the container between the filling step and the injection step or to form a container from a preform and to fill the formed container by placing the outlet in fluidic communication with the preform between the filling step and the injection step.

Advantageously, in such a forming and filling process, or hydroforming process, each preform is heated at a temperature over the glass transition temperature of the material of the preform and the injection of liquid is performed at a liquid pressure greater than 5 bars such that the heated preform expands towards the shape of the molding cavity in which the preform is placed.

According to another aspect, the invention further relates to an injection device for injecting a liquid at an outlet of said device, said device comprising:

an inlet for receiving the liquid, an outlet for injecting the liquid and a chamber extending between the inlet and the outlet, the chamber comprising a cylindrical active portion defining an axis, and a cleaning portion extending between the inlet and the active portion or between the outlet and the active portion, a piston including a body having a cylindrical sealing periphery, wherein the body is axially movable along a body actuation journey, comprising an active stroke and a cleaning stroke such that, when the body is in the active stroke, the sealing periphery fits the wall of the chamber in the active portion, and, when the body is in the cleaning stroke, the body extends inside the cleaning portion of the chamber, where the sealing periphery of said body is separated from the wall of the chamber by a cleaning space.

In the device of the invention according to the above aspect, the cleaning portion of the chamber is preferably cylindrical and coaxial with the cylindrical active portion. The cleaning space therefore has a substantially constant radial thickness all around the sealing periphery, which improves the cleaning operation.

Preferably, the radial thickness of the cleaning space is between 3% and 80% of the radius of the cylindrical sealing periphery, in particular between 5% and 50%, for example between 15% and 25%.

In a particular embodiment, the piston further divides said chamber in an upper chamber, in fluidic communication with the inlet, and a lower chamber, in fluidic communication with the outlet, the piston is movable in said chamber in a filling direction, wherein the volume of the lower chamber increases while the volume of the upper chamber decreases, and in a injecting direction, wherein the volume of the lower chamber decreases while the volume of the upper chamber increases; the piston further comprising a shutter which can move with respect to the body between a relative closed position and a relative open position; the shutter and the body in the relative closed position being arranged so as to provide a fluidic separation between the inlet and the outlet when the piston is moved in the injection direction; the shutter and the body in the relative open position being arranged so as to provide a fluidic communication between the inlet and the outlet when the piston is moved in the filling direction.

According to the above aspect, the invention further relates to a method for injecting a liquid at an outlet of an injecting device, comprising an injecting step during which a piston is moved along an active path towards an injecting direction, fits an active portion of a chamber and separates said outlet from an inlet of the injecting device, characterized in that it further comprises a cleaning step during which said body is moved in a cleaning portion of said chamber wherein the inlet is in direct fluidic communication with the outlet though a cleaning space between the cleaning portion and a periphery of a piston body, and preferably, the body reciprocates about the cleaning position creating a turbulent flow around the body.

BRIEF DESCRIPTION OF THE DRAWINGS

Other aspects and advantages of the invention will appear upon reading the following description, given by way of example and made in reference to the appended drawings, wherein.

DETAILED DESCRIPTION

Figure 1:
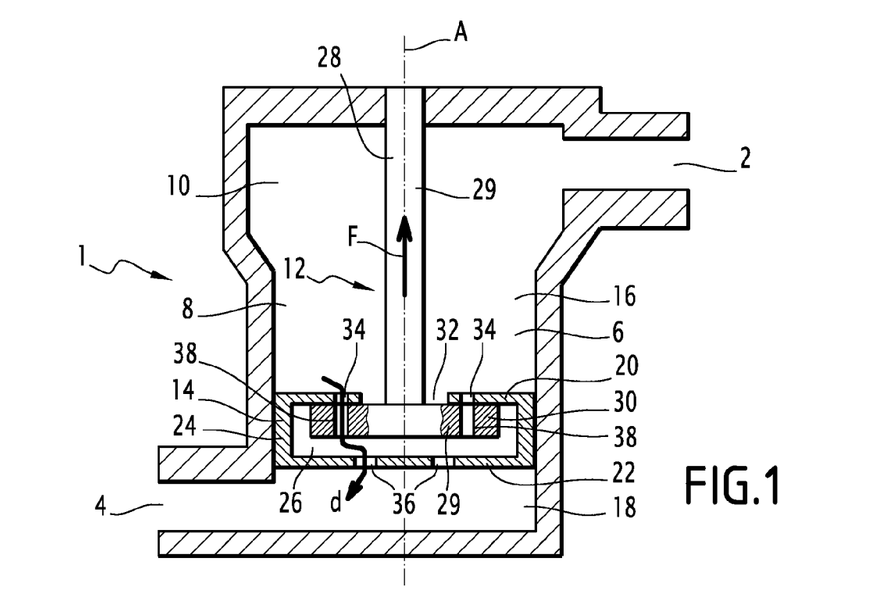
FIG. 1 is a diagrammatical axial cross-section view of an injection device according to the invention, during a filling step of the lower chamber.
Figure 6:
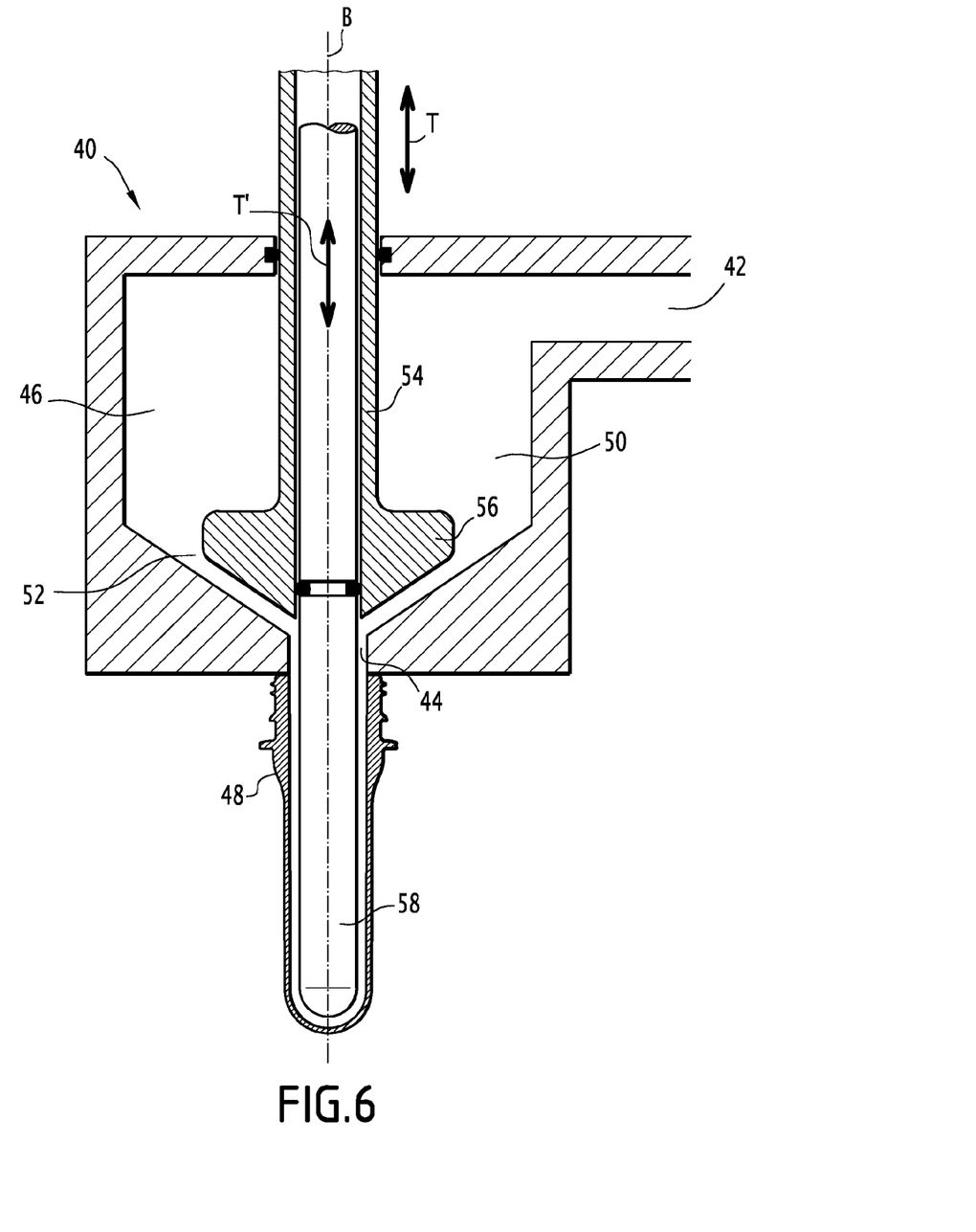
FIG. 6 is a diagrammatical axial cross-section view of an injection nozzle, to be connected with the injection device of the invention, during the injecting step.

Referring to FIG. 1, there is described an injection device 1 according to a first embodiment of the invention, intended to be used in a machine for forming containers, such as plastics bottles and similar, from preforms or for filling such containers with liquid products, such as water or carbonated water based drinks or other products. Such machines are known per se and will not be described in details here. The injection device 1 according to the invention is to be connected with an injection nozzle, as shown in FIG. 6, in such machines, in order to form and fill a container from a preform, in a container hydraulic forming machine. Alternatively, the injection device 1 may be connected with a simple injection nozzle without stretch rod for filling a container.

The injection device 1 comprises an inlet 2, an outlet 4 and a chamber 6 extending between the inlet 2 and the outlet 4.

The inlet 2 is intended to be connected to a source of liquid intended to be injected in the containers or preforms, in order to fill said containers or form said preforms in containers. The source of liquid is for example a reservoir (not shown). The inlet 2 can also be connected to a source of cleaning products, as will be described later.

The outlet 4 is intended to be placed in fluidic communication, for example via the injection nozzle shown in FIG. 6, with a container or a preform, to fill said container or preform with the liquid coming from the inlet 2. The injection nozzle will be described later.

The chamber 6 defines an inner volume temporarily receiving the liquid to be injected via the outlet. The chamber 6 comprises a substantially regular cylindrical portion 8, extending according to an axis A and having a constant diameter. The regular cylindrical portion can also be referred as an active portion of the chamber 6.

According to the embodiment shown in the figures, the chamber 6 further comprises a cleaning portion 10 of cylindrical shape, extending opposite the inlet 2 and having a diameter larger than the diameter of the regular cylindrical portion 8. The cleaning portion 10 extends in the continuity of the regular cylindrical portion 8 and there is no separation between the cleaning portion 10 and the regular cylindrical portion 8. According to an embodiment, the cleaning portion 10 is coaxial with the regular cylindrical portion 8. According to a variant, the cleaning portion could be placed opposite the outlet 4 in the continuity of the regular cylindrical portion 8.

A piston 12 is placed in the chamber 6.

The piston 12 comprises a body 14, which extends in the chamber and is, in normal use, in contact with the wall of the regular cylindrical portion 8 of the chamber 6 such as to divide said chamber 6 in an upper chamber 16 and in a lower chamber 18. This means that the body 14 is of cylindrical shape, having a cross-section complementary of the cross-section of the regular cylindrical portion 8 of the chamber 6 and a diameter equal to the diameter of the regular cylindrical portion 8 such that the body 14 has a sealing periphery in liquid tight fitting with the wall of the regular cylindrical portion 8 of the chamber. The upper chamber 16 extends between the inlet 2 and the body 14 and is in fluidic communication with said inlet 2 and the lower chamber 18 extends between the body 14 and the outlet 4 and is in fluidic communication with the outlet 4.

According to the embodiment shown in FIGS. 1 to 5, the body 14 comprises an upper wall 20, extending on the side of the upper chamber 16 and delimiting said upper chamber 16, and a lower wall 22 extending on the side of the lower chamber 18 and delimiting said lower chamber 18. The upper wall 20 and the lower wall 22 are spaced from each other according to an axial direction defined by the axis A of the regular cylindrical portion 8 and each extend radially such that their radial end, opposite the axis A, is in contact with the wall of the regular cylindrical portion 8 in normal use. The upper wall 20 and the lower wall 22 are connected to each other by a peripheral wall 24 extending axially between the radial ends of the upper wall 20 and of the lower wall 22. Consequently, the peripheral wall 24 defines the sealing periphery of the body and has a shape substantially complementary of the shape of the regular cylindrical portion 8 of the chamber 6 and is in contact with the wall of said regular cylindrical portion 8 in normal use of the piston 12. The upper wall 20, the lower wall 22 and the peripheral wall 24 of the body 14 define together an inner volume 26 of the body.

A mechanical actuator is attached to the piston and is actuable to move the piston 12 as will be described subsequently. The mechanical actuator for example comprises an actuation rod 28 attached to the piston and extending according to axis A of the chamber 6.

The actuation rod 28 comprises a shaft 29 extending across the upper chamber 16 and occupying a reduced space of said upper chamber 16 (i.e. the shaft 29 has a diameter which is much smaller than the diameter of the upper chamber 16). According to an embodiment, the actuation rod 28 further comprises a shutter 30, forming a head of the actuation rod, extending radially inside the inner volume 26 of the body 14 at the end of the shaft 29. The shutter 30 has a diameter less than to the diameter of the peripheral wall 24 of the body 14 and a thickness less than to the distance axially separating the upper wall 20 from the lower wall 22 of the body 14, such that the shutter 30 occupies only a portion of the inner volume 26 of the body 14. The shaft 29 passes through a central opening 32 extending around the axis A in the upper wall 20 of the body and having a diameter inferior to the diameter of the shutter 30.

The upper wall 20 further comprises at least one axial upper aperture 34 extending axially through the upper wall 20 between the upper chamber 16 and the inner volume 26 of the body 14 and placing the inner volume 26 in fluidic communication with the upper chamber 16. According to the embodiment shown in the figures, the upper wall 20 comprises two upper apertures 34. According to variants, the upper wall 20 can comprise more than two upper apertures 34, for example regularly distributed around the shaft 29 of the rod 28.

The lower wall 22 further comprises at least one axial lower aperture 36 extending axially through the lower wall 22 between the inner volume 26 of the body 14 and the lower chamber 18 and placing the inner volume 26 in fluidic communication with the lower chamber 18. According to the embodiment shown in the figures, the lower wall 22 comprises two lower apertures 36. According to variants, the lower wall 22 can comprise more than two lower apertures 36, for example regularly distributed around axis A of the chamber 6.

The upper apertures 34 and the lower apertures 36 are offset radially relative to each other, meaning that the axial upper apertures 34 of the upper wall 20 are not aligned in the axial direction with the axial lower apertures 36 of the lower wall 22.

The shutter 30 of the actuation rod 28 comprises at least one axial aperture 38 extending axially through the shutter 30 and in register with the upper aperture 34 of the upper wall 20 of the body 14, meaning that the axial aperture 38 of the shutter 30 is aligned in the axial direction with the upper aperture 34, while being offset radially relative to the lower aperture 36 of the lower wall 22 of the body 14, meaning that the axial aperture 38 of the shutter 30 is not aligned in the axial direction with the lower aperture 36. According to the embodiment shown in the figures, the shutter 30 comprises two axial apertures 38, each in register with one of the upper aperture 34 of the upper wall 20. The shutter 30 comprises as much axial apertures 38 as the upper wall 20 comprises upper apertures 34, each axial aperture 38 of the shutter 30 being in register with one of the upper aperture 34.

The respective diameters of the upper, lower and axial apertures can be equal to each other or different from each other, provided that the lower apertures 36 remain radially offset relative to the upper and axial apertures, i.e. that no portion of the lower apertures 36 is aligned with a portion of the upper and axial apertures.

The piston 12 further comprises angular guiding features designed for keeping a relative angular position between the shutter 30 and the body 14 within a desired range such that the axial apertures 38 of the shutter 30 remain in register with the upper apertures 34 of the upper wall 20.

Figure 2:
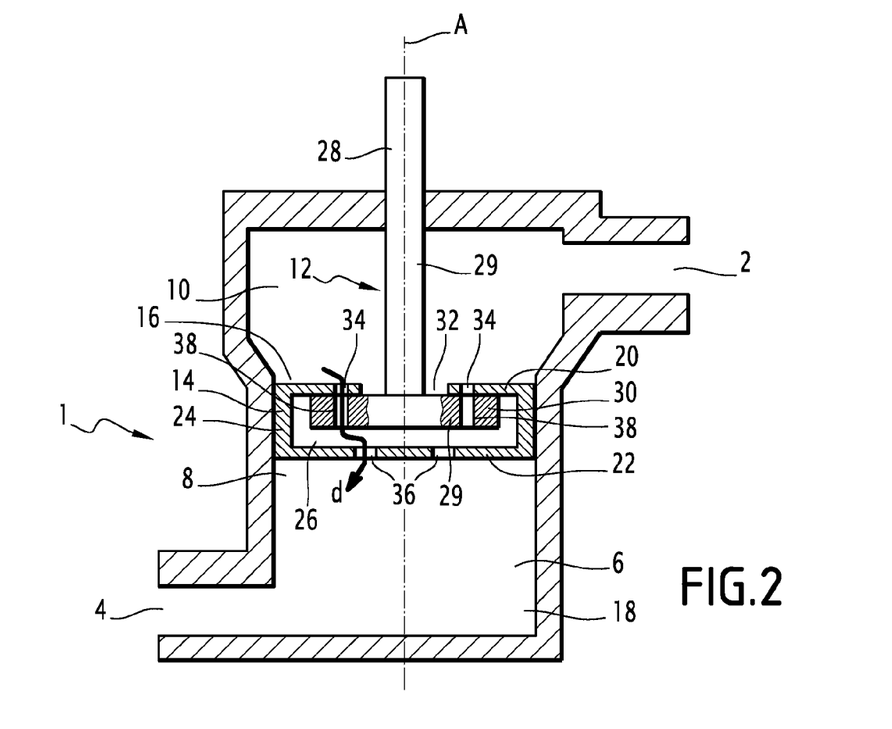
FIG. 2 is a diagrammatical axial cross-section view of the injection device of FIG. 1, once the filling step is completed.
Figure 3:
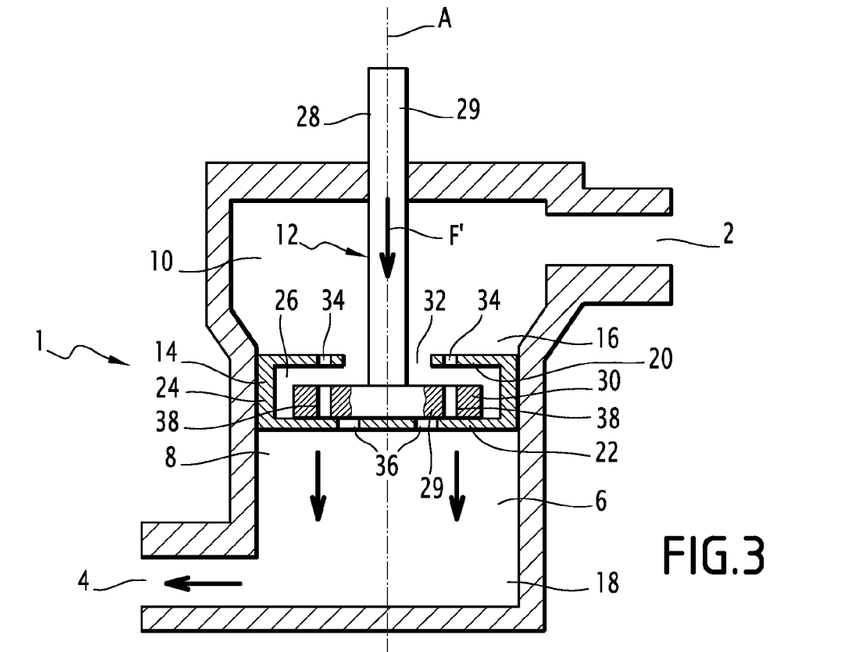
FIGS. 3 and 4 are diagrammatical axial cross-section views of the injection device of FIG. 1, during an injecting step.
Figure 4:
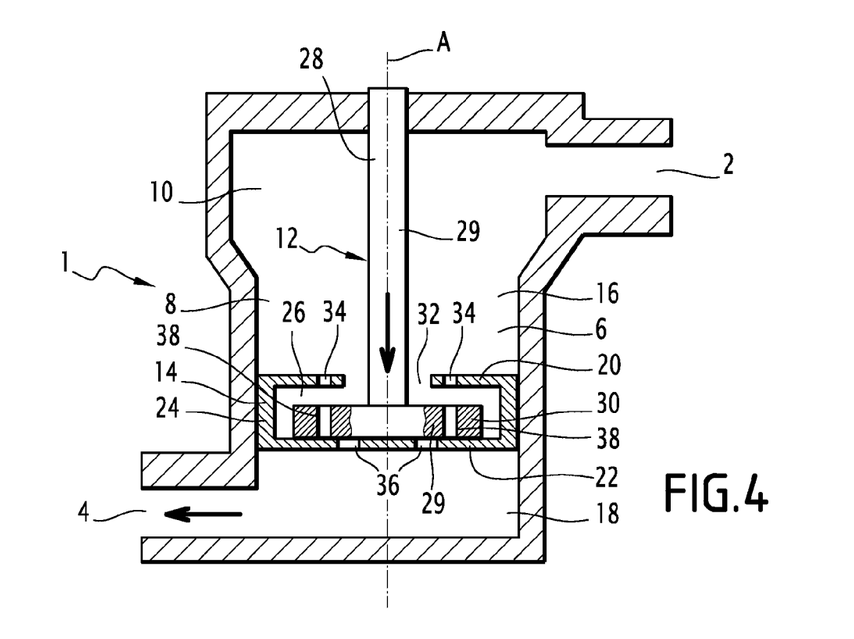

The actuation rod 28 is movable in translation along axis A such that the shutter 30 can be moved inside the inner volume 26 of the body 14 between a filling position, or open position, wherein the shutter 30 is applied against the upper wall 20 of the body 14 as shown in FIGS. 1 and 2, and an injecting position, or closed position, wherein the shutter 30 is applied against the lower wall 22 of the body 14, as shown in FIGS. 3 and 4. The body 14 can be displaced in translation in the chamber 6 via the shutter 30 which pushes either the upper wall 20, in the filling position, or the lower wall 22, in the injecting position when the actuation rod 28 is moved. The body 14 is therefore movable along a body actuation journey comprising an active stroke and a cleaning stroke, as will be described later.

The shutter 30 and the body 14 are rigid elements, meaning that neither the shutter 30 nor the body 14 are substantially deformed, when they are applied against each other.

The actuation rod 28 is movable in a filling direction, wherein the shaft 29 is pulled inside the upper chamber 16, as shown by arrow F of FIG. 1, and a injecting direction, wherein the shaft is pushed inside the upper chamber 16, as shown by arrow F of FIG. 3. When the actuation rod 28 is moved in the filling direction as shown in FIGS. 1 and 2, the shutter 30 is placed against the upper wall 20 of the body 14 in the filling position and pushes against said upper wall 20 such that the body 14 moves towards the inlet 2 and such that the volume of the upper chamber 16 decreases while the volume of the lower chamber 18 increases, as can be seen by comparing FIG. 1 and FIG. 2. In the filling or open position of the shutter 30, the upper chamber 16 is in fluidic communication with the lower chamber 18 via the upper aperture(s) 34 of the upper wall 20, the axial aperture(s) 38 of the shutter 30 and the lower aperture(s) 36 of the lower wall 22 as shown by line d of FIGS. 1 and 2. Indeed, in the filling position, the axial aperture(s) 38 is aligned axially with the upper aperture(s) 34 of the upper wall 20 and the lower aperture(s) 36 of the lower wall 22 is opened at both ends.

When the actuation rod 28 is moved in the injecting direction as shown in FIGS. 3 and 4, the shutter 30 is placed against the lower wall 22 of the body 14 in the injecting position and pushes against said lower wall 22 such that the body 14 moves towards the outlet 4 and such that the volume of the upper chamber 16 increases while the volume of the lower chamber 18 decreases, as can be seen by comparing FIG. 3 and FIG. 4. In the injecting or closed position, the upper chamber 16 and the lower chamber 18 are isolated from each other, i.e. they are not in fluidic communication, by the shutter 30 which closes the lower aperture(s) 36 of the lower wall 22 of the body 14 on the inner volume side. Indeed, when the shutter 30 is applied against the lower wall 22 of the body, since the axial aperture(s) 38 of the shutter 30 is not aligned with the lower aperture(s) 36 of the lower wall 22, said lower aperture(s) 36 is closed by the shutter 30 on the inner volume side of the lower wall 22, as shown in FIGS. 3 and 4. It should be noted that the shutter 30 and the body 14 are placed in relative closed position all along the movement of the piston 12 in the injecting direction, which means that the upper chamber is isolated from the lower chamber all along the displacement of the piston in the injecting direction. In the relative closed position, the pressure applied by the piston on the lower chamber can be controlled by the mechanical actuator.

An injection nozzle 40 intended to be connected with the outlet 4 of the injection device 4 will now be described, in relation with FIG. 6.

The injection nozzle comprises an inlet 42, an outlet 44 and a chamber 46 extending between the inlet 42 and the outlet 44.

The inlet 42 is connected to the outlet 4 of the injection device 1 described previously, meaning that the inlet 42 is in fluidic communication with the outlet 4.

The outlet 44 is intended to be placed in fluidic communication with a container or a preform 48, to fill said container or preform with the liquid coming from the inlet 42 and consequently from the injection device 1. In the embodiment shown in FIG. 6, the outlet 44 is connected to a preform 48, which is to be deformed to form a container, as known per se.

The chamber 46 defines an inner volume temporarily receiving the liquid to be injected via the outlet. The chamber 46 comprises a substantially regular cylindrical portion 50, extending according to an axis B and may have a constant diameter. The chamber 46 further comprises a truncated cone or pyramidal portion 52 extending between the regular cylindrical portion 50 and the outlet 44, the diameter of the chamber 46 reducing progressively from the diameter of the cylindrical portion 50 to the diameter of the outlet 44 in the pyramidal portion 52. Axis B is preferably vertical and can be parallel to axis A.

A hollow control rod 54 extends in the chamber 46 along axis B. The hollow control rod 54 comprises at its end extending in the chamber 46 a sealing ring 56. The sealing ring 56 has a shape which is complementary to the shape of part of the pyramidal portion 52 of the chamber 46, such that, when the sealing ring 56 is applied against the wall of the pyramidal portion 52, the sealing ring 56 closes hermetically the chamber 46 and prevents liquid from flowing through the outlet 44. The hollow control rod 54 is movable in translation along axis B in the chamber 46 between an injecting position, shown in FIG. 6, wherein the sealing ring 56 is spaced from the wall of the pyramidal portion 52 and wherein the outlet 44 is in fluidic communication with the inlet 42 via the chamber 46, and a sealing position, wherein the sealing ring 56 is applied against the wall of the pyramidal portion 52 and hermetically closes the chamber 46.

In the case of hydraulic forming and in a conventional manner, a stretching rod 58 extends inside the hollow control rod 54, passes through the outlet 44 and extends in the preform 48 to assist in the deformation of the preform 48 into a container, as known per se. The stretching rod 56 is movable in translation along axis B in the hollow control rod 54, as shown by arrow T' of FIG. 6. The functioning of the stretching rod 58 is known and will not be described in detail herein.

The functioning of the injection device 1 according to the invention in normal use will now be described. By normal use, it is meant during the injection of a liquid intended to fill a container or to form a container from a preform and optionally to fill said formed container. In normal use, the body 14 moves inside the chamber 6 in an active stroke of the body actuation journey, wherein the body 14 moves in the regular cylindrical portion 8, or active portion, of the chamber 6.

The injection device 1 is connected to a source of liquid in order to place the inlet 2 in fluidic communication with the liquid source. It should be noted that with the device according to the invention, there is no need of a valve between the inlet 2 and the liquid source, the control of the liquid flowing in the chamber 6 from the source being assured by the shutter 30 of the actuation rod 28 inside the body 14 of the piston 12.

During a first step, or filling step shown in FIGS. 1 and 2, the piston is moved in the filling direction in the regular cylindrical portion 8 of the chamber 6 by appropriate control means of the movement of the shaft 29. This movement causes the shutter 30 of the actuation rod 28 to move in its filling position and the body 14 to move in the filling direction as shown by arrow F of FIG. 1. During this filling step, the control rod 54 of the injection nozzle 40 is placed in its sealing position such that the chamber 46 is closed. When the chamber 46 of the injection nozzle is closed, the movement of the shutter 30 in the filling direction creates a difference in pressure between the lower chamber 18 and the upper chamber 16 of the injection device 1, thereby causing liquid to be drawn in the upper chamber 16 from le liquid source through the inlet 2. Since, in the filling position of the shutter 30, the upper chamber 16 is in fluidic communication with the lower chamber 18, the liquid in the upper chamber 16 is transferred to the lower chamber 18 while the volume of the upper chamber 16 is decreased and the volume of the lower chamber 18 is increased, thereby causing the lower chamber 18, and hence the chamber 46 of the injection nozzle 40, to be filled with the liquid.

The injection device 1 according to the invention enables to precisely dose the quantity of liquid to be injected through the outlet 4 in a simple manner by stopping the movement of the piston 12 in the filling direction once the desired volume of the lower chamber 18, corresponding to volume of liquid to be injected, is reached, as shown in FIG. 2.

Once the lower chamber 18 is filled with liquid, the control rod 54 of the injection nozzle 40 is moved to its injecting position, thereby placing the chamber 46, and consequently the lower chamber 18, in fluidic communication with a container or a preform in which the liquid is to be injected via the outlet 44 of the injection nozzle 40 as shown in FIG. 6.

In a second step, or injecting step shown in FIGS. 3 and 4, the piston is moved in the injecting direction. This movement first causes the shutter 30 to be applied against the lower wall 22 of the body 14, thereby isolating the lower chamber 18 from the upper chamber 16 and from the liquid source, as shown in FIG. 3. Then the movement causes the body 14 to move in the injecting direction thereby making the liquid flow from the lower chamber 18 through the outlet 4 in the container or preform, via the injection nozzle 40, until the lower chamber 18 is emptied, as shown in FIG. 4. During this movement, the volume of the upper chamber 16 is increased and is filled by liquid flowing from the liquid source through the inlet 2.

The pressure of the liquid at the outlet 4 can be controlled through the speed of the piston 12 moving in the injecting direction since the shutter and the body are in the relative closed position during the movement of the piston 12 in the injecting direction. The pressure control is important in particular when the liquid to be injected has to deform a preform to shape it into a container, this deformation being performed at high pressure.

It should be noted that there is no need of a valve between the outlet 4 of the injection device 1 and the injection nozzle 40, the control of the liquid flowing in the in the chamber 46 of the injection nozzle and then in the container or preform from the chamber 6 being ensured by the actuation rod 28 of the piston 12.

As can be understood from the description above, the control of the injection of liquid can be easily controlled by controlling the piston 12 without needing extra valves, which are complicated to control and to clean.

The functioning of the injection device 1 during a cleaning step will now be described.

During this cleaning step, the inlet 2 is placed in fluidic communication with a cleaning products source, such as water, optionally mixed with cleaning agents for example, and the outlet 4 is placed in fluidic communication, via the injection nozzle 40, with a container dedicated for this cleaning step, known as a dummy container. The dummy container therefore replaces the preform 48 shown in FIG. 6. The dummy container comprises an outlet which is in fluidic communication with the cleaning products source. Consequently, a closed loop is formed between the cleaning products source and the dummy container, the cleaning products being able to flow from the source through the injection device 1, through the injection nozzle 40 and through the dummy container and back to the source.

The cleaning products is caused to fill the chamber 6 by appropriated movement of the piston 12 and of the control rod 54, as described above in relation with the normal use of the injection device 1.

The piston 12 is then caused to move up and down in the regular cylindrical portion 8 of the chamber 6, alternatively in the filling and in the injecting directions, thereby making the cleaning products to circulate between the chamber 6 and the dummy container and around the shutter 30 of the actuation rod 28, and along the wall of the chamber 6. This operation constitutes a regular cleaning of the injection device 1 and of the injection nozzle 40. During the operation, the body 14 is in the active stroke.

Figure 5:
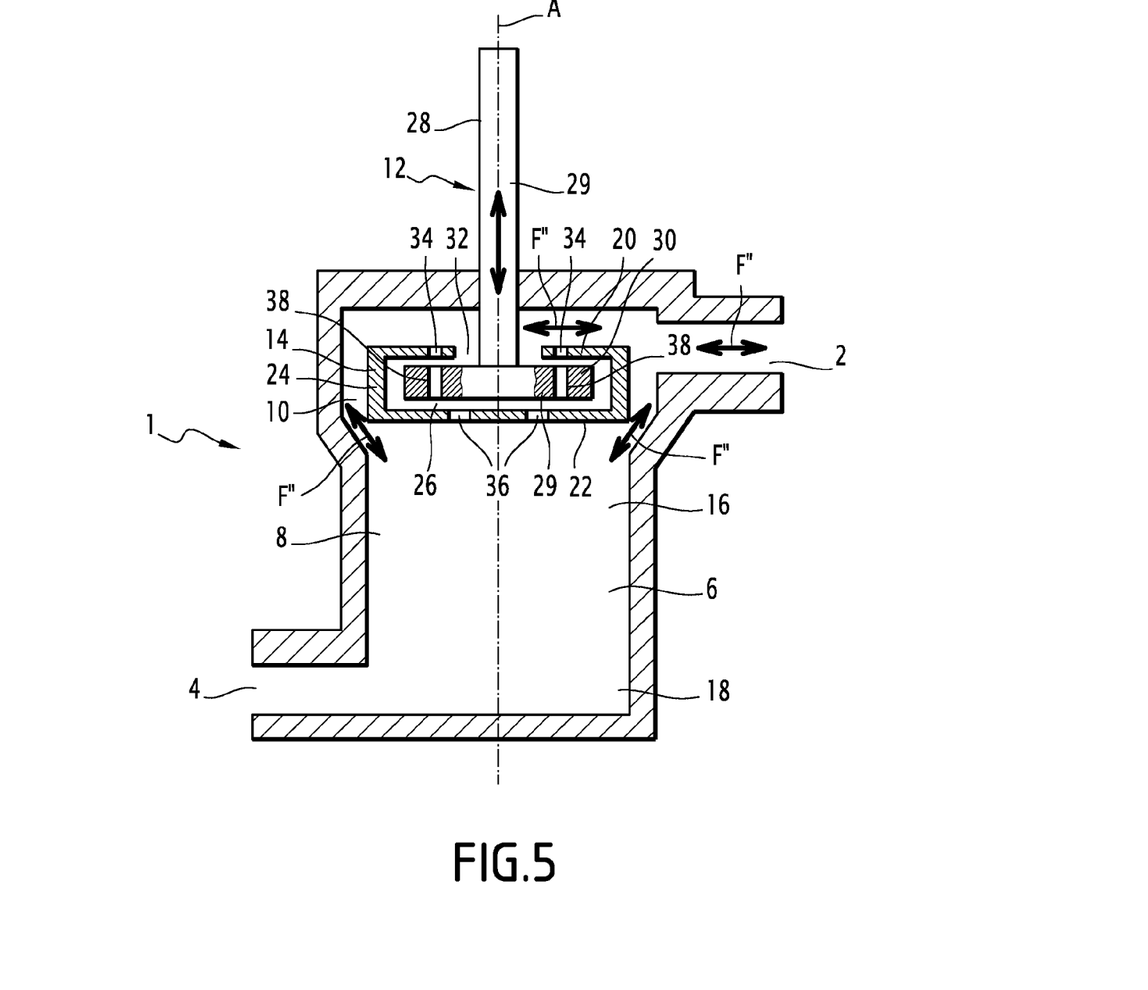
FIG. 5 is a diagrammatical axial cross-section view of the injection device of FIG. 1, during a cleaning step.

For a more complete cleaning, and in particular a thorough cleaning of the shutter 30 and of the inner volume 26 of the body 14, the body 14 is placed in a cleaning position, wherein the body is located in the cleaning portion 10 of the chamber 6, where the sealing periphery of said body is separated from the wall of the chamber 6 by a cleaning space, as shown in FIG. 5. In the cleaning position, the cleaning products are able to flow around the body 14, as shown by arrow F" of FIG. 5, since the body 14 is no longer applied against the wall of the regular cylindrical portion 8 of the chamber 6. In the cleaning position, the inlet 2 is in direct fluidic communication with the outlet 4. Therefore, the cleaning products are able to reach all the parts of the injection device 1, ensuring a proper cleaning of the piston 12 and of the chamber 6. In the cleaning stroke of the body actuation journey, where the body 14 is placed in the cleaning portion 10 of the chamber, an up and down movement of the piston 12 can be performed in the cleaning portion 10 to create turbulences in the flow of the cleaning products in the upper chamber 16 and in the cleaning portion 10 of the chamber 6, thereby ensuring a stirring of the cleaning products all around the piston 12, including in the inner volume 26 of the body 14, which improves the cleaning of the body 14 and of the actuation rod 28.

In the cleaning position, the shutter 30 can also be placed in a cleaning position wherein the shutter 30 extends between the upper wall 20 and the lower wall 22 of the body 14 without being in contact with said walls, thereby placing the upper opening(s) 34 in direct fluidic communication with the lower opening(s) 36 and ensuring that the cleaning products reaches all the areas of the body 14 in the inner volume 26.

The particular arrangement of the body 14 and the shutter 30 described above constitutes an example of a piston arrangement according to the invention. Other embodiments of the piston are shown in FIGS. 7 to 12 and will now be described.

The reference numerals designating the same parts as in the first embodiment described above remain the same. Since only the piston 12 is modified in the other embodiments, only part of the chamber 6 has been represented in FIGS. 7 to 12.

Figure 7:
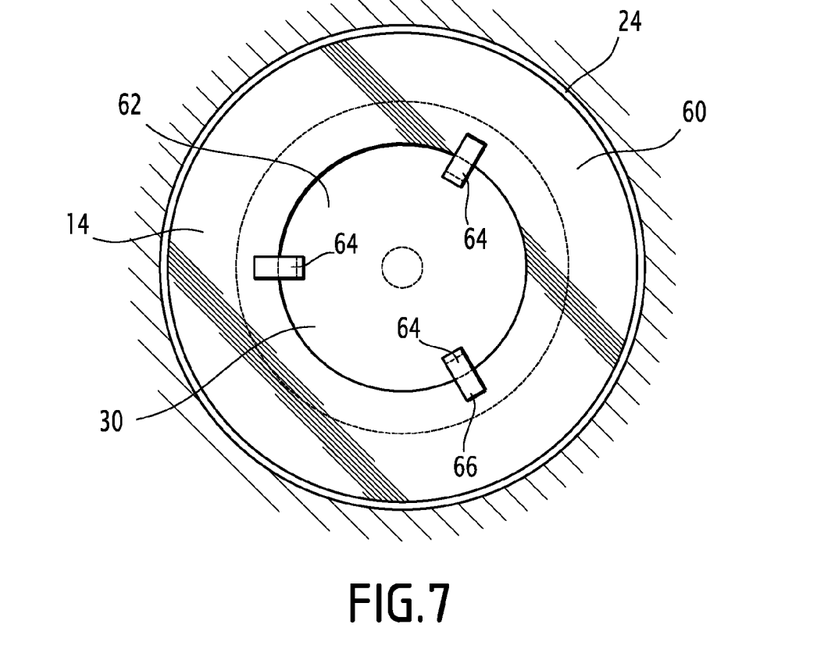
FIG. 7 is a diagrammatical radial cross-section view of an injection device according to another embodiment of the invention.
Figure 8:
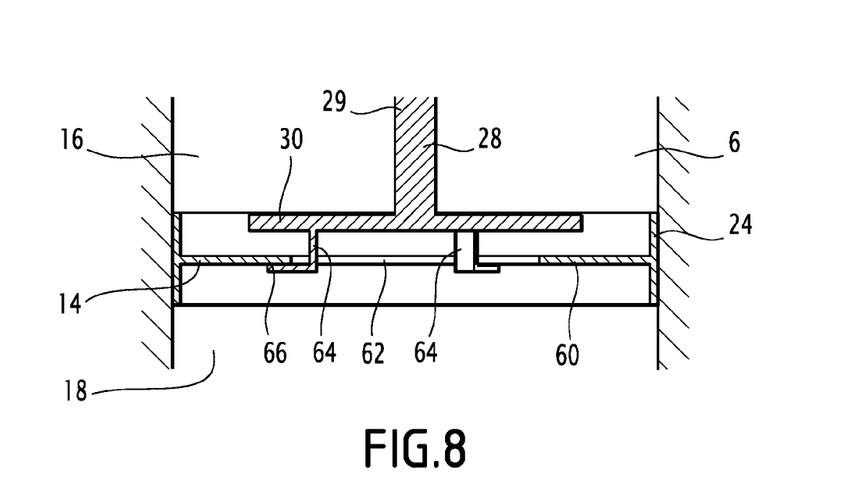
FIG. 8 is a diagrammatical axial cross-section view of part of the injection device of FIG. 7, during a filling step of the lower chamber.

According to a second embodiment shown in FIGS. 7 and 8, the body 14 of the piston 12 is formed by a circular plate 60 extending radially in the chamber 6, having a diameter substantially equal to the diameter of the regular cylindrical portion 8 of the chamber, and comprising at least one central aperture 62. The peripheral wall 24 of the body 14 extends perpendicularly to the circular plate 60 on either side of said plate 60 such that the peripheral wall 24 forms a sleeve extending around the circular plate 60 in the radial and axial directions. The peripheral wall 24 still defines the sealing periphery of the body 14.

The shutter 30 still forms the head of the actuation rod 28 and is arranged on the upper chamber side of the circular plate 60. The shutter 30 has a diameter which is inferior to the diameter of the circular plate 60 but superior to the diameter of the central aperture 62. The shutter 30 further comprises means for holding the body 14, for example at least one hooked shape element 64 arranged to keep the shutter 30 attached to the body 14 during the displacement of the actuation rod 28. The shutter 30 comprises for example three hooked shape elements 64 passing through the central aperture 62 and each having a shoulder 66 adapted to hold the circular plate 60 on its lower chamber side, as shown in FIG. 8.

When the actuation rod 28 is moved in the filling direction, the shutter 30 is displaced relative to the body 14 until the shoulders 66 of the hooked shape elements 64 are applied against the circular plate 60, as shown in FIG. 8. In this open position, the lower chamber 18 is in fluidic communication with the upper chamber 16 via the central aperture 62 of the body 14. Further movement of the actuation rod 28 in the filling direction causes the shutter 30 to pull, via the hooked shape elements 64, the body 14 in the filling direction while the shutter 30 remains in the open position relative to the body 14. Consequently, the filling step as previously described can be performed.

When the actuation rod 28 is moved in the injecting direction, the shutter 30 is displaced relative to the body 14 until it rests on the circular plate 60 and covers the central aperture 62. In this closed position, the lower chamber 18 is isolated from the upper chamber 16, thereby preventing fluidic communication between the chambers. Further movement of the actuation rod 28 in the injecting direction causes the shutter 30 to push the body in the injecting direction while the shutter 30 remains in the closed position. Consequently, the injection step as previously described can be performed.

The cleaning step can also be performed as previously described.

It should be noted that pushing or pulling the body are meant as a contact action of the shutter on the body in opposite directions, regardless of the traction or the compression of the actuation rod.

According to the third and fourth embodiments, respectively shown in FIGS. 9-10 and 11-12, the mechanical actuator comprises an actuation rod 28, which is attached to the body 14 instead of being attached to the shutter 30, which is a floating shutter 30. In the third embodiment, shown in FIGS. 9 and 10, the body 14 is also formed by a circular plate 60, having at least one central aperture 62 and by a peripheral wall 24 forming a sleeve extending around the circular plate 60 in the radial and axial directions.

Figure 9:
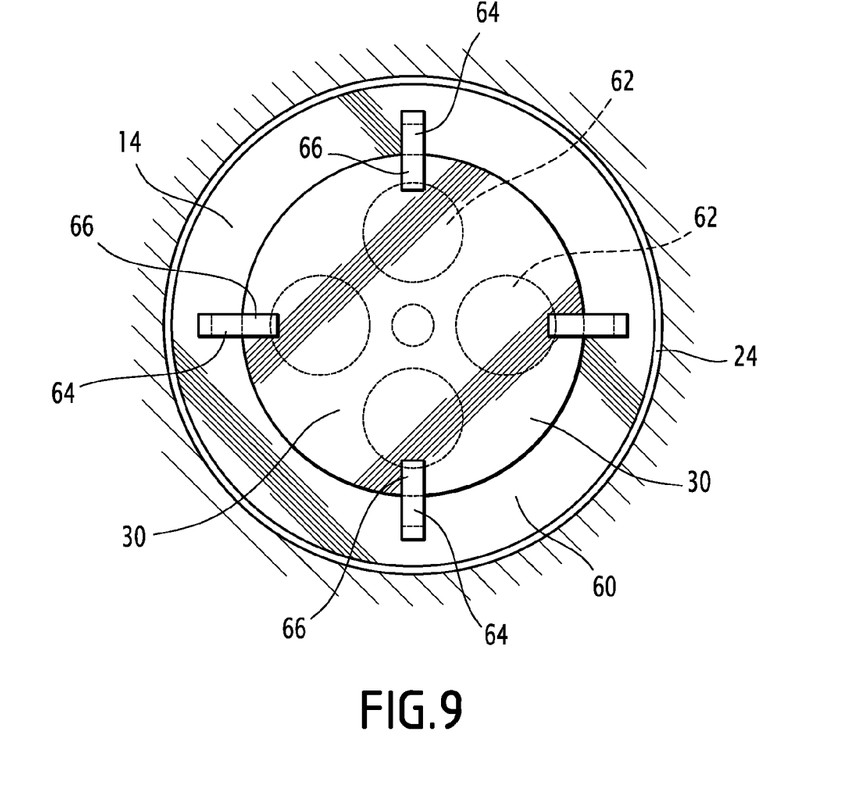
FIG. 9 is a diagrammatical radial cross-section view of an injection device according to another embodiment of the invention.

According to the embodiment shown in FIG. 9, the circular plate 60 comprises a plurality of central apertures 62 regularly distributed around the shaft 29 of the rod 28.

Figure 10:
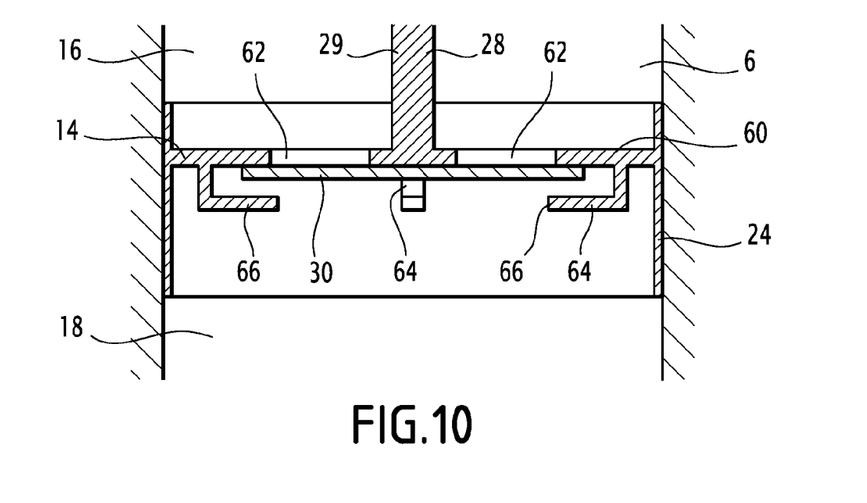
FIG. 10 is a diagrammatical axial cross-section view of part of the injection device of FIG. 9, during an injecting step.

The shutter 30 is arranged on the lower chamber side of the circular plate 60 and has a diameter inferior to the diameter of the circular plate 60 but a diameter large enough the close all the central apertures 62, when the shutter 30 is applied against the circular plate 60, as shown in FIG. 10.

The body 14 comprises means for holding the shutter 30, for example at least one hooked shape element 64 arranged to keep the shutter 30 attached to the body 14 during the displacement of the actuation rod 28. The body 14 comprises for example four hooked shape elements 64 extending around the floating shutter 30 from the lower chamber side of the central plate 60 and each having a shoulder 66 adapted to hold the circular plate 60 on its lower chamber side, as shown in FIG. 10.

When the actuation rod 28 is moved in the filling direction, the body 14 is displaced relative to the shutter 30 until the shoulders 66 of the hooked shape elements 64 are applied against the shutter 30. In this open position, the lower chamber 18 is in fluidic communication with the upper chamber 16 via the central aperture(s) 62 of the body 14. Further movement of the actuation rod 28 in the filling direction causes the body 14 to pull, via the hooked shape elements 64, the shutter 30 in the filling direction while the shutter 30 remains in the open position relative to the body 14. Consequently, the filling step as previously described can be performed.

When the actuation rod 28 is moved in the injecting direction, the body 14 is displaced relative to the shutter 30, until the shutter 30 is applied against the lower chamber side of the circular plate 60 and covers the central aperture(s) 62, as shown in FIG. 10. In this closed position, the lower chamber 18 is isolated from the upper chamber 16, thereby preventing fluidic communication between the chambers. Further movement of the actuation rod 28 in the injecting direction causes the body 14 to push the shutter 30 in the injecting direction while the shutter 30 remains in the closed position. Consequently, the injection step as previously described can be performed.

The cleaning step can also be performed as previously described.

Figure 11:
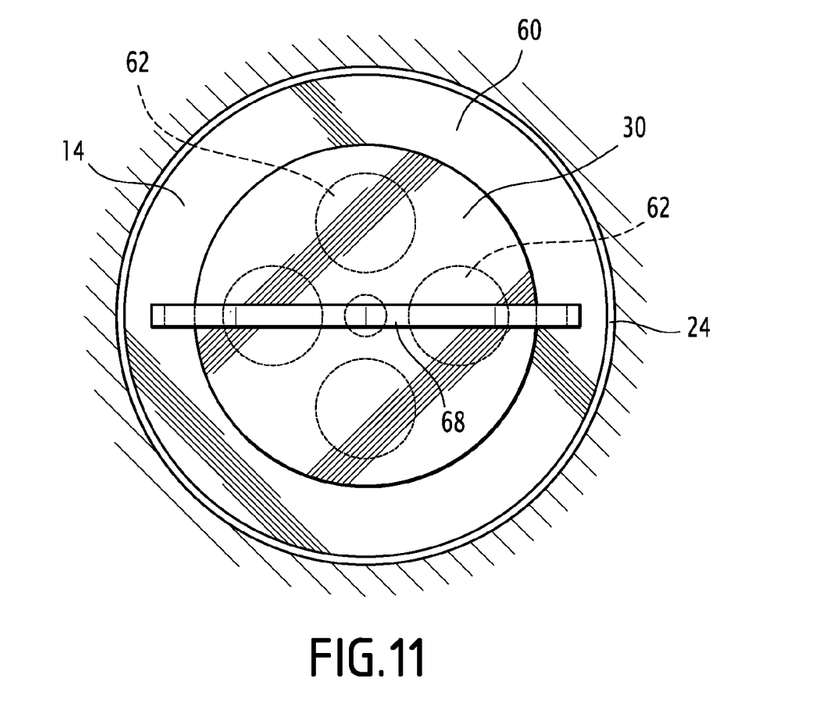
FIG. 11 is a diagrammatical radial cross-section view of an injection device according to another embodiment of the invention.
Figure 12:
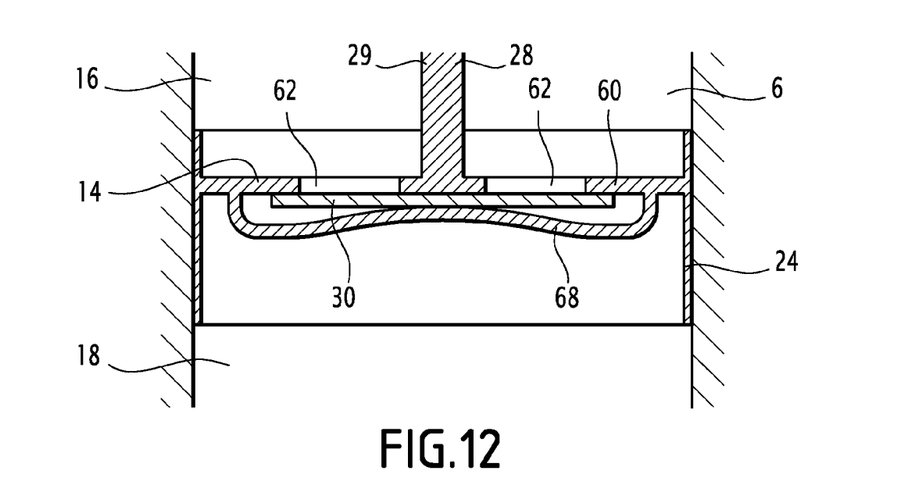
FIG. 12 is a diagrammatical axial cross-section view of part of the injection device of FIG. 11, during an injecting step.

The fourth embodiment, shown in FIGS. 11 and 12, is similar to the third embodiment, except that the hooked shape elements 64 are replaced by a spring element 68. The spring element 68 extends from the lower chamber side of the central plate 60 across the central apertures such that the shutter 30 is trapped between the lower chamber side of the central plate 60 and the spring element 68. The spring element 68 is arranged to apply a resilient force on the shutter 30 in the filling direction, such that under said force, the shutter 30 is applied against the lower chamber side of the central plate 60 and covers the central aperture(s) 62 and is maintained in the close position isolation the lower chamber 18 from the upper chamber, as shown in FIG. 12.

When the actuation rod 28 is moved in the filling direction, the body 14 is displaced relative to the shutter 30 and the shutter 30 is submitted to a force opposite to the force applied by the spring element 68, due to the displacement of the shutter 13 in the filling direction and to the difference in pressure between the upper chamber 16 and the lower chamber 18 during this movement. Consequently, the shutter 30 causes the spring element 68 to be deformed toward the lower chamber 18 and enables the shutter 30 to move in the open position, where the upper chamber 16 is placed in fluidic communication with the lower chamber 18. Consequently, the filling step as previously described can be performed.

Once the filling step is performed, the spring element 68 returns to its initial shape and applies the shutter 30 against the body 14 in the closed position. Consequently, the injection step as previously described can be performed.

The cleaning step can also be performed as previously described.

As can be understood form the description above, the cleaning of the injection device 1, according to all the embodiments, can be performed in a simple manner without having to dismantle the injection device 1. Consequently, the machine does not have to be stopped to clean the injection device 1 and the cleaning is less time consuming than in conventional injection devices. The throughput of the machine can therefore be improved.

The invention claimed is:

1. An injection device for injecting a liquid, the device comprising:
    an inlet for receiving the liquid, an outlet for injecting the liquid and a chamber extending between the inlet and the outlet,
    a piston extending in the chamber and dividing the chamber into an upper chamber in fluidic communication with the inlet and a lower chamber in fluidic communication with the outlet, the piston being movable in the chamber in a filling direction, wherein the volume of the lower chamber increases while the volume of the upper chamber decreases, and in a injecting direction, wherein the volume of the lower chamber decreases while the volume of the upper chamber increases, the piston comprising a body having a sealing periphery being in liquid tight fitting with a wall of the chamber between the upper chamber and the lower chamber,
    the piston further including a shutter that is moveable with respect to the body between a closed position, wherein the body and the shutter isolate the upper chamber from the lower chamber and prevent fluidic communication between the upper chamber and lower chamber when the piston is moved in the injecting direction, and an open position, wherein the body and the shutter place the upper chamber in fluidic communication with the lower chamber when the piston is moved in the filling direction; and
    an actuator mechanically coupled to the piston and configured to move the piston in the filling direction and the injecting direction.

2. The injection device according to claim 1, wherein the body (14) and the shutter (30) isolate the upper chamber (16) from the lower chamber (18) all along the movement of the piston (12) in the injecting direction.

3. An injection device for injecting a liquid at an outlet of the device, the device comprising:
    an inlet for receiving the liquid, an outlet for injecting the liquid and a chamber extending between the inlet and the outlet;
    a piston extending in the chamber and dividing the chamber into an upper chamber, in fluidic communication with the inlet, and a lower chamber, in fluidic communication with the outlet, the piston being movable in the chamber in a filling direction, wherein the volume of the lower chamber increases while the volume of the upper chamber decreases, and in a injecting direction, wherein the volume of the lower chamber decreases while the volume of the upper chamber increases, the piston comprising a body having a sealing periphery being in liquid tight fitting with a wall of the chamber between the upper chamber and the lower chamber;
    a mechanical actuator attached to the piston, the mechanical actuator being actuable to move the piston in the injecting direction and in the filling direction; and
    the piston further includes a shutter that is moveable with respect to the body between a relative closed position, wherein the body and the shutter isolate the upper chamber from the lower chamber and prevent fluidic communication between the upper and lower chambers when the piston is moved in the injecting direction, and a relative open position, wherein the body and the shutter place the upper chamber in fluidic communication with the lower chamber when the piston is moved in the filling direction.

4. The injection device according to claim 3, wherein the mechanical actuator comprises an actuation rod (28) attached to the shutter (30), the shutter (30) and the body (14) being rigid, wherein when the actuation rod (28) is moved in the injecting direction, the shutter (30) closes at least one aperture (36, 32) of the body (14) and moves the body (14) in the injecting direction, and, when the actuation rod (28) is moved in the filling direction, the shutter (30) opens the aperture (36, 62) of the body (14) and moves the body (14) in the filling direction.

5. The injection device according to claim 4, wherein the body (14) defines an inner volume (26) and comprises at least one lower aperture (36), provided in a lower wall (22) of the body (14) and through which the inner volume (26) is in fluidic communication with the lower chamber (18), and at least one upper aperture (34), provided in an upper wall (20) of the body (14) and through which the inner volume (26) is in fluidic communication with the upper chamber (16), the shutter (30) extending in the inner volume (26) of the body (16) and comprising at least one aperture (38) extending through the shutter (30) and in register with the upper aperture (16) of the body (14) and offset relative to the lower aperture (36) of the body (14), the actuation rod (28) being movable in the filling and injecting directions between a filling position wherein the shutter (30) is in contact against the upper wall (20) of the body (14) such that the upper chamber (16) is in fluidic communication with the lower chamber (16) via the upper aperture (34), the aperture (38) of the shutter (30) and the lower aperture (36) such that the liquid can be transferred from the inlet (2) to the lower chamber (18), and an injecting position, wherein the shutter (30) is in contact against the lower wall (22) of the body and closes the lower aperture (36) such that the lower chamber (18) is isolated from the upper chamber (16) and the liquid in the lower chamber (18) can be injected through the outlet (4) when the actuation rod (28) is moved in the injecting direction.

6. The injection device according to claim 4, comprising angular guides keeping a relative angular position between the shutter (30) and the body (14) within a desired range.

7. The injection device according to claim 5, wherein the shutter has a cleaning position wherein the shutter (30) extends in the inner volume (26) of the body (14) without being engaged against the upper wall (20) or the lower wall (22), the upper aperture (34) being in direct fluidic communication with the lower aperture (36) in the cleaning position of the shutter (30).

8. The injection device according to claim 5, wherein the body comprises at least two upper apertures (34) and at least two lower apertures (36), the shutter (30) comprising at least two apertures (38), each of them being in register with one of the upper apertures (34) and offset relative to the lower apertures (36).

9. The injection device according to claim 3, wherein the mechanical actuator comprises an actuation rod (28) attached to the body (14) and wherein the shutter (30) is a floating shutter, wherein, when the actuation rod (28) is moved in the injecting direction, the shutter (30) closes at least one aperture (62) of the body (14) and is moved by the body (14) in the injecting direction, and, when the actuation rod (28) is moved in the filling direction, the shutter (30) opens the aperture (62) of the body (14) and is moved by the body (14) in the filling direction.

10. The injection device according to claim 1, wherein the body (14) is movable along a body actuation stroke comprising an active stroke and a cleaning stroke, the chamber having a cleaning portion (10) extending between the upper chamber (16) and the inlet (2) or between the lower chamber (18) and the outlet (4), such that, when the body (14) is in the active stroke, the sealing periphery engages the wall of the chamber (6) between the upper chamber (16) and the lower chamber (18), and, when the body (14) is in the cleaning stroke, the body extends inside the cleaning portion (10) of the chamber, where the sealing periphery of the body (14) is separated from the wall of the chamber (6) by a cleaning space.

11. A method for injecting a liquid using an injection device, the injection device having an inlet for receiving the liquid, an outlet for injecting the liquid and a chamber extending between the inlet and the outlet, a piston extending in the chamber and dividing the chamber into an upper chamber in fluidic communication with the inlet and a lower chamber in fluidic communication with the outlet, the piston being movable in the chamber in a filling direction that increases the volume of the lower chamber while decreasing the volume of the upper chamber, the piston being movable in the chamber in a injecting direction that decreases the volume of the lower chamber while increasing the volume of the upper chamber, the piston having a body with a sealing periphery in liquid tight fit with a wall of the chamber, the piston further including a shutter moveable with respect to the body between a closed position where the body and the shutter isolate the upper chamber from the lower chamber and prevent fluidic communication between the upper chamber and lower chamber when the piston is moved in the injecting direction and an open position where the body and the shutter place the upper chamber in fluidic communication with the lower chamber when the piston is moved in the filling direction, the method comprising:
moving the piston in a filling direction during a filling step wherein the shutter is placed in the open position with respect to the body, such that the liquid coming from the inlet in the upper chamber is moved to the lower chamber via the fluidic communication provided by the shutter and the body,
moving the piston in an injecting direction during an injecting step wherein the shutter is placed in the closed position with respect to the body, such that the liquid in the lower chamber is injected through the outlet, and
wherein the moving of the piston in the filling direction and the moving of the piston in the injecting direction are performed by actuating a mechanical actuator attached to the piston.

12. The method according to claim 11, wherein the piston is moved in the filling direction all along a filling step and/or wherein the piston is moved in the injecting direction all along an injecting step.

13. The method according to claim 11, further comprising a dosing step, wherein the piston (12) is moved in the filling direction until a desired volume of the lower chamber (18), corresponding to volume of liquid to be injected, is reached.

14. The method according to claim 11, further comprising a cleaning step wherein an actuation rod (28) and the body (14) are moved in the chamber (6) alternately in the filling and injecting directions, the movement causing cleaning products to move from the inlet (2) to the outlet (4) and around the shutter (30) of the piston (12).

15. The method according to claim 11, wherein the body (14) is moved to a cleaning portion (10) of the chamber (6) located between the upper chamber and the inlet or between the lower chamber and the outlet, wherein the cleaning products are able to move around the body (14) of the piston (12) in the cleaning portion.

16. The method according to claim 15, wherein the body (14) is alternately moved in the cleaning portion (10) of the chamber (6) in the filling and injecting directions to create a turbulent flow in the cleaning portion (10).

17. The method according to claim 11, wherein the outlet (4) is placed in fluidic communication with a container before the injecting step, such that the liquid in the lower chamber (18) is injected inside the container during the injecting step and fills the container.

18. A method for injecting a liquid using an injection device, the injection device having an inlet for receiving the liquid, an outlet for injecting the liquid and a chamber extending between the inlet and the outlet, a piston extending in the chamber and dividing the chamber into an upper chamber in fluidic communication with the inlet and a lower chamber in fluidic communication with the outlet, the piston being movable in the chamber in a filling direction that increases the volume of the lower chamber while decreasing the volume of the upper chamber, the piston being movable in the chamber in a injecting direction that decreases the volume of the lower chamber while increasing the volume of the upper chamber, the piston having a body with a sealing periphery in liquid tight fit with a wall of the chamber, the piston further including a shutter moveable with respect to the body between a closed position where the body and the shutter isolate the upper chamber from the lower chamber and prevent fluidic communication between the upper chamber and lower chamber when the piston is moved in the injecting direction and an open position where the body and the shutter place the upper chamber in fluidic communication with the lower chamber when the piston is moved in the filling direction, the method comprising:
moving the piston in a filling direction during a filling step wherein the shutter is placed in the open position with respect to the body, such that the liquid coming from the inlet in the upper chamber is moved to the lower chamber via the fluidic communication provided by the shutter and the body,
moving the piston in an injecting direction during an injecting step wherein the shutter is placed in the closed position with respect to the body, such that the liquid in the lower chamber is injected through the outlet, and
wherein the outlet is placed in fluidic communication with a preform of a container before the injecting step, such that the liquid in the lower chamber is injected inside a preform during the injecting step and deforms the preform in order for the preform to acquire the shape of a container.

* * * * *